United States Patent
Wang et al.

(10) Patent No.: US 12,325,813 B2
(45) Date of Patent: Jun. 10, 2025

(54) OPTICAL CLEAR ADHESIVE COMPOSITION, OPTICAL CLEAR ADHESIVE LAYER, AND METHOD OF FORMING OPTICAL CLEAR ADHESIVE LAYER

(71) Applicants: Interface Optoelectronics (ShenZhen) Co., Ltd., Guangdong (CN); Interface Technology (ChengDu) Co., Ltd., Sichuan (CN); General Interface Solution Limited, Miaoli County (TW)

(72) Inventors: Yao Yu Wang, Guangdong (CN); Liping Liu, Guangdong (CN); Huiyi Zhong, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 547 days.

(21) Appl. No.: 17/822,125

(22) Filed: Aug. 24, 2022

(65) Prior Publication Data

US 2024/0034913 A1 Feb. 1, 2024

(30) Foreign Application Priority Data

Aug. 1, 2022 (CN) .................. 202210916177.0

(51) Int. Cl.
*C09J 7/10* (2018.01)
*C09J 7/38* (2018.01)
*C09J 11/06* (2006.01)

(52) U.S. Cl.
CPC ............. *C09J 7/10* (2018.01); *C09J 7/385* (2018.01); *C09J 11/06* (2013.01); *C09J 2301/416* (2020.08); *C09J 2409/00* (2013.01); *C09J 2433/00* (2013.01)

(58) Field of Classification Search
None
See application file for complete search history.

(56) References Cited

U.S. PATENT DOCUMENTS

| | | | | | |
|---|---|---|---|---|---|
| 4,175,017 A | * | 11/1979 | Kuntz | ............ | C08F 220/12 522/182 |
| 4,934,714 A | * | 6/1990 | Lynch | ............ | B41N 6/02 522/120 |
| 7,329,693 B2 | * | 2/2008 | Giza | ............ | B60C 9/00 522/119 |
| 7,456,231 B2 | * | 11/2008 | Jackson | ............ | C08L 23/0815 522/74 |
| 7,829,605 B2 | * | 11/2010 | Watanabe | ............ | C08F 290/046 522/158 |
| 8,921,443 B2 | * | 12/2014 | Herr | ............ | C09J 147/00 520/1 |
| 9,163,167 B2 | * | 10/2015 | Ogawa | ............ | C09J 133/08 |
| 9,645,691 B2 | * | 5/2017 | Ogikubo | ............ | G06F 3/0446 |
| 9,740,350 B2 | * | 8/2017 | Ogikubo | ............ | B32B 7/12 |
| 9,886,135 B2 | * | 2/2018 | Ogikubo | ............ | B32B 3/085 |
| 10,093,837 B2 | * | 10/2018 | Lu | ............ | C09J 5/00 |
| 10,106,708 B2 | * | 10/2018 | Bieber | ............ | C08L 23/142 |
| 10,125,294 B2 | * | 11/2018 | Mitamura | ............ | C09D 4/06 |
| 10,676,654 B2 | * | 6/2020 | Moon | ............ | C09J 133/08 |
| 11,208,575 B2 | * | 12/2021 | Cunningham | ............ | C09J 175/16 |
| 11,619,800 B2 | * | 4/2023 | Lin | ............ | G02B 7/09 359/823 |
| 12,071,500 B2 | * | 8/2024 | Fujiwara | ............ | C08F 279/02 |
| 12,168,739 B2 | * | 12/2024 | Fujiwara | ............ | G02B 1/14 |
| 12,230,862 B2 | * | 2/2025 | Ouyang | ............ | H01Q 1/364 |
| 2003/0091818 A1 | * | 5/2003 | Banba | ............ | C09J 175/04 428/343 |
| 2011/0018127 A1 | * | 1/2011 | Lee | ............ | H01L 24/29 257/E23.005 |
| 2014/0190736 A1 | * | 7/2014 | Cao | ............ | C08L 21/00 522/182 |
| 2015/0050432 A1 | * | 2/2015 | Ooga | ............ | C08C 19/38 428/1.54 |
| 2015/0079379 A1 | * | 3/2015 | Suzuki | ............ | C09J 151/003 522/18 |
| 2015/0166860 A1 | * | 6/2015 | Yuan | ............ | B32B 37/1284 522/18 |
| 2015/0376466 A1 | * | 12/2015 | Mitamura | ............ | G06F 3/0445 428/41.5 |
| 2016/0355705 A1 | * | 12/2016 | Kawano | ............ | C08F 220/1811 |
| 2017/0253769 A1 | * | 9/2017 | Cho | ............ | C09J 7/10 |
| 2017/0306194 A1 | * | 10/2017 | Kwak | ............ | B32B 27/08 |
| 2021/0122947 A1 | * | 4/2021 | Tabata | ............ | G09F 9/00 |

FOREIGN PATENT DOCUMENTS

| CN | 102163394 B | * | 12/2013 | ............ | C08F 290/06 |
|---|---|---|---|---|---|
| CN | 104449419 A | * | 3/2015 | | |
| CN | 106978094 A | * | 7/2017 | | |
| CN | 108467699 A | * | 8/2018 | | |
| CN | 113004814 A | * | 6/2021 | ............ | C08J 9/00 |

(Continued)

*Primary Examiner* — Sanza L. McClendon

(74) *Attorney, Agent, or Firm* — CKC & Partners Co., LLC

(57) ABSTRACT

An optical clear adhesive composition includes a first polydiene, a second polydiene, a plurality of acrylate monomers, and a photoinitiator. The first polydiene has a first weight average molecular weight of 500 Da to 1500 Da. The second polydiene has a second weight average molecular weight of 50000 Da to 110000 Da. The acrylate monomers include at least two different hydroxyacrylates.

20 Claims, 5 Drawing Sheets

(56) References Cited

FOREIGN PATENT DOCUMENTS

| | | | | |
|---|---|---|---|---|
| DE | 3879742 | * | 5/1993 | |
| EP | 3026065 A1 | * | 6/2016 | ............. C08C 19/28 |
| IE | 50787 B1 | * | 7/1986 | |
| JP | H07138332 A | * | 5/1995 | |
| JP | 2004107602 A | * | 4/2004 | |
| JP | 2006016549 A | * | 1/2006 | |
| JP | 2008101105 A | * | 5/2008 | |
| JP | 4353009 B2 | * | 10/2009 | |
| JP | 4427216 B2 | * | 3/2010 | |
| JP | 2021054980 A | * | 4/2021 | .............. C08L 21/00 |
| JP | 2021070707 A | * | 5/2021 | |
| KR | 2012077916 A | * | 7/2012 | ............ C09J 133/04 |
| KR | 102784850 B1 | * | 3/2025 | |
| TW | I485214 B | * | 5/2015 | |
| TW | 202030286 A | * | 8/2020 | ............. B32B 27/00 |
| WO | WO-2006129678 A1 | * | 12/2006 | .......... C08F 290/046 |
| WO | WO-2013173977 A1 | * | 11/2013 | ......... B29C 65/1406 |
| WO | WO-2018037912 A1 | * | 3/2018 | ................ C08F 2/48 |

* cited by examiner

OPTICAL CLEAR ADHESIVE COMPOSITION, OPTICAL CLEAR ADHESIVE LAYER, AND METHOD OF FORMING OPTICAL CLEAR ADHESIVE LAYER

CROSS-REFERENCE TO RELATED APPLICATION

This application claims priority to China Application Serial Number 202210916177.0, filed Aug. 1, 2022, which is herein incorporated by reference in its entirety.

BACKGROUND

Field of Invention

The present disclosure relates to an optical clear adhesive composition, an optical clear adhesive layer, and a method of forming optical clear adhesive layer.

Description of Related Art

Optical clear adhesives bind parts in modules, for example, the display and the touch modules in mobile phones, tablets, smartwatches, augmented reality/virtual reality (AR/VR), etc. However, when a solid optical clear adhesive is used to bind parts with three-dimensional surfaces in a module, due to the difference in the surface thickness and accuracy, it is hard to fill the solid optical clear adhesive into the concave and convex surface areas and therefore causes bubbles leading to low module yield. Although an liquid optical clear adhesive is suitable to bind parts with three-dimensional surfaces in a module, it often has insufficient adhesion strength at high temperature, and the elastic modulus of the liquid optical clear adhesive changes a lot when the temperature in the environment becomes high (especially in the environment where the temperature and the humidity change dramatically and in such environment, the thermal deformation is significant). In these situations, the liquid optical clear adhesive separates from the module and generates bubbles, affecting, for example, the display quality of the module or the touch sensitivity of the module. Therefore, besides having good optical properties, to avoid bubble formation, a good optical clear adhesive should have good adhesion strength and good resistance to the change between cold and hot.

SUMMARY

The present disclosure relates to an optical clear adhesive composition. In some embodiments of the present disclosure, the optical clear adhesive composition includes a first polydiene, a second polydiene, a plurality of acrylate monomers, and a photoinitiator. The first polydiene has a first weight average molecular weight of 500 Da to 1500 Da. The second polydiene has a second average molecular weight of 50000 Da to 110000 Da. The acrylate monomers include at least two different hydroxyacrylates.

In some embodiments of the present disclosure, a mass ratio of the first polydiene to the second polydiene is 1:7 to 1:9.

In some embodiments of the present disclosure, the first polydiene and the second polydiene account for 30 wt % to 60 wt % in the optical clear adhesive composition, the acrylate monomers account for 35 wt % to 65 wt % in the optical clear adhesive composition, and the photoinitiator accounts for 0.1 wt % to 5 wt % in the optical clear adhesive composition.

In some embodiments of the present disclosure, the first polydiene includes polyisoprene, polybutadiene, or a combination thereof, and the second polydiene includes polyisoprene, polybutadiene, or a combination thereof.

In some embodiments of the present disclosure, the at least two different hydroxyacrylates include hydroxypropyl methacrylate and hydroxyethyl methacrylate.

In some embodiments of the present disclosure, the at least two different hydroxyacrylates account for 4.2 wt % to 25 wt % in the optical clear adhesive composition.

In some embodiments of the present disclosure, the acrylate monomers include 3-phenoxybenzyl acrylate, tricyclo [5.2.1.02,6]decan-8-ol methacrylate, hydroxypropyl methacrylate, hydroxyethyl methacrylate, and lauryl acrylate.

In some embodiments of the present disclosure, the 3-phenoxybenzyl acrylate accounts for 5 wt % to 40 wt % in the optical clear adhesive composition, the tricyclo [5.2.1.02,6]decan-8-ol methacrylate accounts for 10 wt % to 40 wt % in the optical clear adhesive composition, the hydroxypropyl methacrylate accounts for 4 wt % to 15 wt % in the optical clear adhesive composition, the hydroxyethyl methacrylate accounts for 0.2 wt % to 10 wt % in the optical clear adhesive composition, and the lauryl acrylate accounts for 0 wt % to 15 wt % in the optical clear adhesive composition.

In some embodiments of the present disclosure, the photoinitiator is a phosphine oxide photoinitiator.

In some embodiments of the present disclosure, the phosphine oxide photoinitiator includes diphenyl(2,4,6-trimethylbenzoyl)phosphine oxide.

In some embodiments of the present disclosure, the optical clear adhesive composition further includes an antioxidant, a crosslinking agent, and a leveling agent.

In some embodiments of the present disclosure, the antioxidant includes 2,6-di-tert-butyl-4-methylphenol, the crosslinking agent includes 2,6-bis(4-azidobenzylidene)-4-methylcyclohexanone, and the leveling agent includes modified polysiloxane.

In some embodiments of the present disclosure, the 2,6-di-tert-butyl-4-methylphenol accounts for 0.1 wt % to 5 wt % in the optical clear adhesive composition, the 2,6-bis(4-azidobenzylidene)-4-methylcyclohexanone accounts for 0.1 wt % to 5 wt % in the optical clear adhesive composition, and the modified polysiloxane accounts for 0.1 wt % to 5 wt % in the optical clear adhesive composition.

The present disclosure also relates to an optical clear adhesive layer. The optical clear adhesive layer is prepared by curing and crosslinking the optical clear adhesive composition described above with an ultraviolet light irradiation.

In some embodiments of the present disclosure, a ratio of an adhesion strength to an elastic modulus of the optical clear adhesive layer at a temperature of 80° C. to 90° C. is greater than 1.

In some embodiments of the present disclosure, a tensile strength of the optical clear adhesive layer is between 3.7 N/mm$^2$ to 3.8 N/mm$^2$.

In some embodiments of the present disclosure, an optical phase difference of the optical clear adhesive layer is zero.

In some embodiments of the present disclosure, a haze of the optical clear adhesive layer is between 0.01% to 0.03%.

The present disclosure yet also relates to a method of forming optical clear adhesive layer. The method includes irradiating the optical clear adhesive composition described above with an ultraviolet light to cure and crosslink the optical clear adhesive composition.

In some embodiments of the present disclosure, an intensity of the ultraviolet light is between 40 mW/cm² to 200 mW/cm².

BRIEF DESCRIPTION OF THE DRAWINGS

When reading the accompanying figures of the present disclosure, it is recommended to understand various aspects of the present disclosure from the following description. It is important to note that, according to the standard industry practice, various feature sizes are not plotted into scale. To make the discussion clearer, various feature sizes can arbitrarily increase or decrease.

DETAILED DESCRIPTION

To make the description of the present disclosure more detailed and complete, the following embodiments and specific examples of the present disclosure are described in an illustrative manner, which does not limit the embodiments of the present disclosure to be implemented in only one form. The embodiments of the present disclosure may combine or be substituted with other embodiments in any preferable circumstance. Other embodiments may be attached to the embodiments of the present disclosure without further statement or explanation.

The present disclosure provides an optical clear adhesive composition. The optical clear adhesive composition includes a first polydiene, a second polydiene, a plurality of acrylate monomers, and a photoinitiator. The first polydiene has a first weight average molecular weight of 500 Da to 1500 Da. The second polydiene has a second average molecular weight of 50000 Da to 110000 Da. The acrylate monomers include at least two different hydroxyacrylates. An optical clear adhesive layer prepared using the optical clear adhesive composition of the present disclosure has good optical properties, such as high transmittance (e.g., 99.5% transmittance between 400 nm to 800 nm), high refraction, low haze (e.g. 0.01% to 0.03%), and zero optical phase difference when light passes the optical clear adhesive layer. Even in a high-temperature and high-humidity environment or in a situation where the module has been deformed, the optical phase difference is still zero. Moreover, the optical clear adhesive layer prepared using the optical clear adhesive composition of the present disclosure has good adhesion strength and good elastic modulus, in which the ratio of adhesion strength to elastic modulus is greater than 1 (i.e., adhesion strength is greater than elastic modulus). Even under high temperatures of 80° C. to 90° C., the ratio of adhesion strength to elastic modulus is greater than 1. The ratio of adhesion strength to elastic modulus greater than 1 means that optical clear adhesive layer of the present disclosure binds the parts in the module well. In addition, the optical clear adhesive layer prepared using the optical clear adhesive composition of the present disclosure suppresses the bubble to form even in the environments with high temperature and high humidity and the environments with dramatic changes between cold and hot (e.g., in the environment of temperature cycling between −40° C. and 85° C. for 504 hours). The following is detailed description of the optical clear adhesive composition of the present disclosure according to some embodiments.

Figure 1:
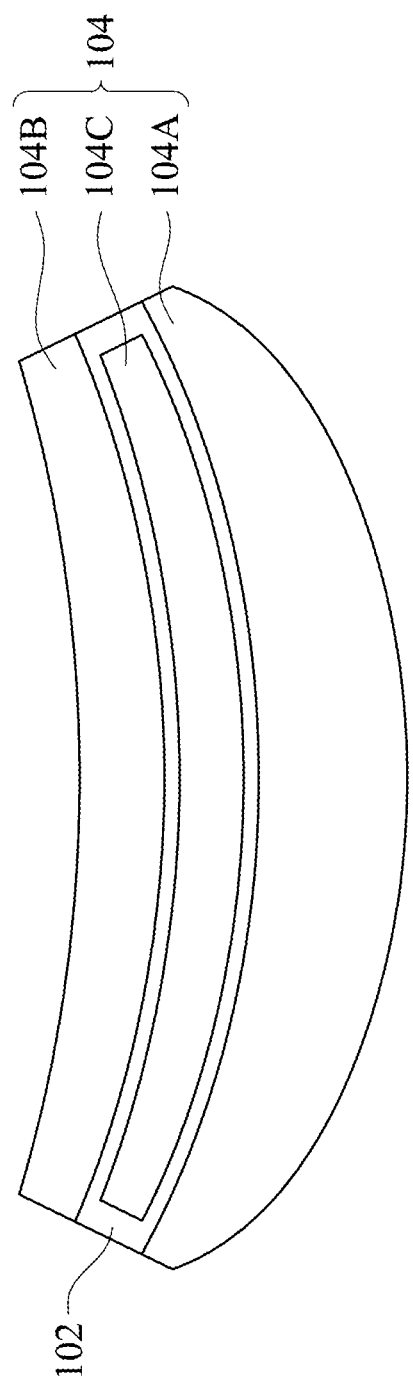
FIG. 1 is a cross-sectional view of an optical clear adhesive composition applied to a module according to some embodiments of the present disclosure.
Figure 2:
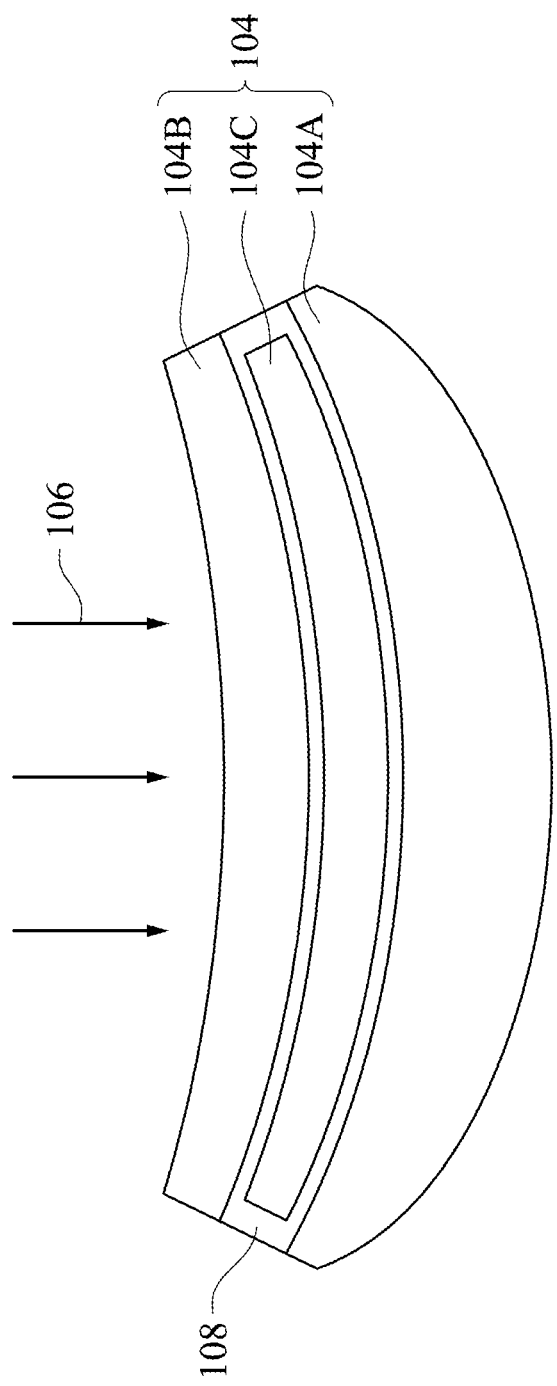
FIG. 2 is a cross-sectional view of an optical clear adhesive layer prepared by irradiating an ultraviolet light on an optical clear adhesive composition applied to a module according to some embodiments of the present disclosure.

FIG. 1 is a cross-sectional view of an optical clear adhesive composition 102 applied to a module 104 according to some embodiments of the present disclosure. FIG. 2 is a cross-sectional view of an optical clear adhesive layer 108 prepared by irradiating an ultraviolet light 106 on the optical clear adhesive composition 102 applied to the module 104 of FIG. 1. In FIGS. 1 and 2, the module 104 includes a substrate 104A, a substrate 104B, and a membrane 104C, in which the liquid optical clear adhesive composition 102 is applied between the membrane 104C and the substrate 104A and between the membrane 104C and the substrate 104B (as shown in the module 104 of FIG. 1). After irradiating the optical clear adhesive composition 102 with an ultraviolet light 106, the optical clear adhesive composition 102 cures and forms an optical clear adhesive layer 108, in which the membrane 104C is bonded between the substrate 104A and the substrate 104B (as shown in FIG. 2). It should be noted that FIGS. 1 and 2 are related to illusive embodiments, about the optical clear adhesive composition 102 of the present disclosure applied to a module and about the optical clear adhesive layers 108 of the present disclosure formed after an irradiation of an ultraviolet light. The optical clear adhesive composition 102 of the present disclosure and the optical clear adhesive layers 108 of the present disclosure are not limited to, for example, applying only to the modules 104 as shown in FIGS. 1 and 2. For example, the module may have concave and convex surfaces as shown in FIGS. 1 and 2, or in some embodiments, the module may have plane surfaces that are not as those shown in FIGS. 1 and 2. Further in some embodiments, the module may have a different structure than that shown in FIGS. 1 and 2, for example, the structure excludes the membrane 104C. In the case excluding the membrane 104C, the optical clear adhesive composition 102 may apply between the substrate 104A and the substrate 104B and form the optical clear adhesive layer 108 binding the substrate 104A and the substrate 104B. Regardless of what the module is, applying the optical clear adhesive composition 102 on any material and forming the optical clear adhesive layer 108 from the optical clear adhesive composition 102 for binding any materials are within the scope of the present disclosure.

Figure 3:
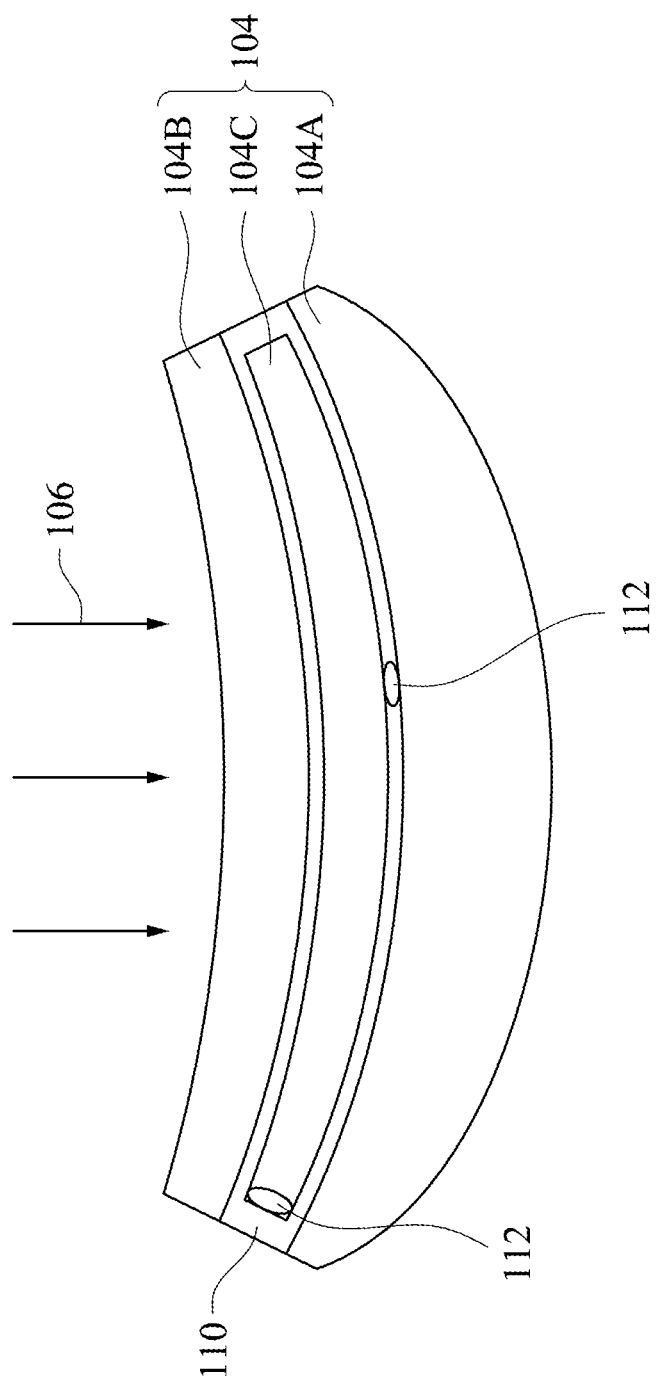
FIG. 3 is a cross-sectional view of an optical clear adhesive layer prepared by irradiating an ultraviolet light on an optical clear adhesive composition applied to a module according to some comparative embodiments of the present disclosure.

FIG. 3 is a cross-sectional view of an optical clear adhesive layer 110 prepared by irradiating the ultraviolet light 106 on an optical clear adhesive composition (not shown) applied to the module 104 according to some comparative embodiments of the present disclosure. The difference between FIG. 3 and FIGS. 1 and 2 is a different optical clear adhesive composition, instead of the optical clear adhesive composition 102 of the present disclosure. The optical clear adhesive composition is applied between the membrane 104C and the substrate 104A and between the membrane 104C and the substrate 104B of the module 104. After the irradiation of the ultraviolet light 106, the optical clear adhesive composition cures and forms the optical clear adhesive layer 110. This optical clear adhesive layer 110, different from the above-described optical clear adhesive layer 108, binds the membrane 104C to the substrate 104A and the substrate 104B. The optical clear adhesive layer 110 prepared using the optical clear adhesive composition of the comparative embodiment generates bubbles 112 at the edge of the adhesion. The bubbles 112 cause the performance of the module 104 being poor, for example, poor optical properties, low adhesion strength, and weak adaptability under high temperature and high humidity or the environments where cold and hot changes differently.

The following is detailed description of the first polydiene and the second polydiene in the optical clear adhesive composition 102 of the present disclosure. The first polydiene has the first weight average molecular weight of 500 Da to 1500 Da, e.g., 500 Da, 1000 Da, and 1500 Da, in which 1500 Da is preferable. The second polydiene has the second weight average molecular weight of 50000 Da to 110000 Da, e.g. 50000 Da, 80000 Da, and 110000 Da, in which 110000 Da is preferable. The first polydiene and the second polydiene are prepolymers and they are modified by the acrylate monomers (described below) to obtain improved properties, for example, in the present disclosure, the improved optical properties, adhesion strength, and elastic modulus, and also the suppression of the bubble formation. In some embodiments, a mass ratio of the first polydiene to the second polydiene is adjusted to obtain, for example, appropriate elastic modulus, damage factor, and glass transition temperature. For example, the mass ratio of the first polydiene to the second polydiene is 1:7 to 1:9, in which 1:8 is preferable. In some embodiments, the first polydiene and the second polydiene in the optical clear adhesive composition 102 account for 30 wt % to 60 wt %, preferably 40 wt % to 50 wt %, and more preferably 40 wt % to 45 wt %. In some embodiments, the first polydiene includes polyisoprene, polybutadiene, or a combination thereof, in which polyisoprene is preferable. In some embodiments, the second polydiene includes polyisoprene, polybutadiene, or a combination thereof, in which polyisoprene is preferable.

The following is detailed description of the acrylate monomers in the optical clear adhesive composition 102. The acrylate monomers include at least two different hydroxyacrylates. In some embodiments, the at least two different hydroxyacrylates include hydroxypropyl methacrylate and hydroxyethyl methacrylat. In some embodiments, the acrylate monomers include 3-phenoxybenzyl acrylate, tricyclo[5.2.1.02,6]decan-8-ol methacrylate, hydroxypropyl methacrylate, hydroxyethyl methacrylate, and lauryl acrylate, in which hydroxypropyl methacrylate and hydroxyethyl methacrylate are preferable. The first polydiene and the second polydiene modified by the above acrylate monomers improve the optical properties, adhesion strength, and elastic modulus, and also suppress the bubbles formation in the optical clear adhesive layer 108 prepared by the optical clear adhesive composition 102 of the present disclosure. Furthermore, each acrylate monomer has its own significant effect to enhance the properties more. 3-Phenoxybenzyl acrylate has the significant effect in increasing the softening temperature of the modified first polydiene and second polydiene. Tricyclo[5.2.1.02,6]decan-8-ol methacrylate has the significant effect in increasing the light refraction of the modified first polydiene and second polydiene. Hydroxypropyl methacrylate and hydroxyethyl methacrylate have the significant effects in increasing the adhesion strength of the modified first polydiene and second polydiene. Lauryl acrylate has the significant effect in increasing the softness of the modified first polydiene and second polydiene. In some embodiments, the acrylate monomers in the optical clear adhesive composition 102 account for 35 wt % to 65 wt %, preferably 45 wt % to 55 wt %. In some embodiments, the at least two different hydroxyacrylates in the optical clear adhesive composition account for 4.2 wt % to 25 wt %, preferably 4.2 wt % to 11 wt %, more preferably 4.8 wt % to 7.4 wt %. In some embodiments, 3-phenoxybenzyl acrylate in the optical clear adhesive composition 102 accounts for 5 wt % to 40 wt %, preferably 10 wt % to 20 wt %; tricyclo[5.2.1.02,6]decan-8-ol methacrylate in the optical clear adhesive composition 102 accounts for 10 wt % to 40 wt %, preferably 20 wt % to 30 wt %; hydroxypropyl methacrylate in the optical clear adhesive composition 102 accounts for 4 wt % to 15 wt %, preferably 4 wt % to 10 wt %; hydroxyethyl methacrylate in the optical clear adhesive composition 102 accounts for 0.2 wt % to 10 wt %, preferably 0.2 wt % to 1 wt %; and lauryl acrylate in the optical clear adhesive composition 102 accounts for 0 wt % to 15 wt %, preferably 0 wt % to 5 wt %.

The following is detailed description of the photoinitiator in the optical clear adhesive composition 102 of the present disclosure. After the irradiation of the ultraviolet light, the photoinitiator induces the optical clear adhesive composition 102 to perform polymerization and crosslinking reaction, which cures the optical clear adhesive composition 102 to form the optical clear adhesive layer 108. In some embodiments, the photoinitiator is a phosphine oxide photoinitiator. In some embodiments, the phosphine oxide photoinitiator includes diphenyl(2,4,6-trimethylbenzoyl)phosphine oxide, having an ability to cure the optical clear adhesive composition 102 with low ultraviolet light intensity, for example, 40 mW/cm$^2$ to 200 mW/cm$^2$, e.g., 40 mW/cm$^2$, 100 mW/cm$^2$, and 200 mW/cm$^2$. The low ultraviolet light intensity avoids the yellowing to happen in the module. In some embodiments, the photoinitiator in the optical clear adhesive composition 102 accounts for 0.1 wt % to 5 wt %, preferably 1 wt % to 2 wt %.

In addition to the first polydiene, the second polydiene, the acrylate monomers, and the photoinitiator, the optical clear adhesive composition 102 further includes an antioxidant, a crosslinking agent, and a leveling agent. In some embodiments, the antioxidant includes 2,6-di-tert-butyl-4-methylphenol, the crosslinking agent includes 2,6-bis(4-azidobenzylidene)-4-methylcyclohexanone, and the leveling agent includes modified polysiloxane. The above antioxidant, crosslinking agent, and leveling agent improve the performance of the optical clear adhesive composition 102 and the optical clear adhesive layer 108 formed thereof further. For example, 2,6-di-tert-butyl-4-methylphenol can avoid insufficient crosslinking by oxygen inhibition; 2,6-bis (4-azidobenzylidene)-4-methylcyclohexanone can enhance the crosslinking and curing efficiency of the optical clear adhesive composition 102 in the formation of the optical clear adhesive layer 108 after irradiating the ultraviolet light; and modified polysiloxane can improve the leveling property of the surface morphology of the optical clear adhesive layer 108. In some embodiments, 2,6-di-tert-butyl-4-methylphenol in the optical clear adhesive composition 102 accounts for 0.1 wt % to 5 wt %, preferably 0.1 wt % to 0.5 wt; 2,6-bis(4-azidobenzylidene)-4-methylcyclohexanone in the optical clear adhesive composition 102 accounts for 0.1 wt % to 5 wt %, preferably 1 wt % to 5 wt %; and modified polysiloxane in the optical clear adhesive composition 102 accounts for 0.1 wt % to 5 wt %, preferably 0.1 wt % to 05 wt %.

The present disclosure also provides the optical clear adhesive layer 108, which is prepared by curing and crosslinking the above optical clear adhesive composition 102 with an ultraviolet light irradiation. The components and the corresponding concentrations of the optical clear adhesive layer 108 have been described above and will not repeat hereafter. The optical clear adhesive layer 108 formed by the above optical clear adhesive composition 102 has many advantages, such as good optical properties, i.e., high transmittance (e.g., 99.5% transmittance between 400 nm to 800 nm), high refraction, low haze (e.g. 0.01% to 0.03%), and zero optical phase difference when light passes the optical clear adhesive layer. Even in a high-temperature and high-humidity environment or in a situation where the module has been deformed, the optical phase difference is still zero. Moreover, the optical clear adhesive layer of the present disclosure has good adhesion strength and good elastic modulus, in which the ratio of adhesion strength to elastic modulus is greater than 1 (i.e., adhesion strength is greater than elastic modulus). Even under high temperatures of 80° C. to 90° C., the ratio of adhesion strength to elastic modulus is greater than 1. The ratio of adhesion strength to elastic modulus greater than 1 means that optical clear adhesive layer of the present disclosure binds the parts in the module well. In addition, the optical clear adhesive layer of the present disclosure suppresses the bubble to form even in the environments with high temperature and high humidity and the environments with dramatic changes between cold and hot (e.g., in the environment of temperature cycling between −40° C. and 85° C. for 504 hours).

The present disclosure yet also provides a method of forming optical clear adhesive layer. The method includes the following operation: irradiating the above optical clear adhesive composition 102 with an ultraviolet light to cure and crosslink the optical clear adhesive composition 102 to form the optical clear adhesive layer 108. In some embodiments, before irradiating the optical clear adhesive composition 102 with an ultraviolet light, the optical clear adhesive composition 102 is liquid, so when the optical clear adhesive composition 102 is applied to a module, it fits well to various concave and convex surfaces on the module. In some embodiments, after irradiating the optical clear adhesive composition 102 with an ultraviolet light, the optical clear adhesive composition 102 undergoes a crosslinking reaction, which makes the fluidity of the optical clear adhesive composition 102 decrease and the optical clear adhesive composition 102 cures in the end. The curved optical clear adhesive composition 102 or the optical clear adhesive layer 108 binds the components of the module (e.g. the substrate 104A, the substrate 104B, and the membrane 104C in FIGS. 1 and 2) firmly. In some embodiments, an intensity of the ultraviolet light is between 40 mW/cm$^2$ to 200 mW/cm$^2$, for example, 40 mW/cm$^2$, 100 mW/cm$^2$, and 200 mW/cm$^2$. Using the optical clear adhesive composition 102 provided in the present disclosure avoids the yellowing of the module because the use of low intensity of ultraviolet light is enough to cure the optical clear adhesive composition 102. Moreover, the cured optical clear adhesive layer 108 has a tensile strength greater than 3.5 N/mm$^2$, e.g., 3.7 N/mm$^2$ to 3.8 N/mm$^2$. Specifically, the tensile strength of the optical clear adhesive layer 108 after irradiating 40 mW/cm$^2$ ultraviolet light is 3.8 N/mm$^2$; the tensile strength of the optical clear adhesive layer 108 after irradiating 100 mW/cm$^2$ ultraviolet light is 3.8 N/mm$^2$; and the tensile strength of the optical clear adhesive layer 108 after irradiating 200 mW/cm$^2$ ultraviolet light is 3.7 N/mm$^2$. Strong tensile strength means that even irradiating the optical clear adhesive composition 102 of the present disclosure with low intensity ultraviolet light, the degree of curing and crosslinking is still high.

Next, the optical clear adhesive composition 102 and the optical clear adhesive layer 108 formed thereof in the present disclosure are illustrated in detailed embodiments. In Table 1 and Table 2, Table 1 shows the components and the corresponding concentrations of the optical clear adhesive composition 102 in Embodiment 1, Embodiment 2, Embodiment 3, and Embodiment 4, and Table 2 shows the components and the corresponding concentrations of the optical clear adhesive composition in Comparative Embodiment 1. The concentration units in Table 1 and Table 2 are mass percentage concentrations (wt %).

TABLE 1

|  | Embodiment 1 | Embodiment 2 | Embodiment 3 | Embodiment 4 |
| --- | --- | --- | --- | --- |
| Polyisoprene | 45 | 40 | 48 | 43 |
| 3-Phenoxybenzyl acrylate | 11.3 | 15 | 10 | 12 |
| Tricyclo[5.2.1.02,6]decan-8-ol methacrylate | 26 | 30 | 25 | 28 |
| Hydroxypropyl methacrylate | 7 | 4.3 | 8 | 7 |
| Hydroxyethyl methacrylate | 0.4 | 0.5 | 0.6 | 0.4 |
| Lauryl acrylate | 4.5 | 4.5 | 3 | 4.0 |
| Diphenyl(2,4,6-trimethyl-benzoyl)phosphine oxide | 1.8 | 2.0 | 2 | 1.6 |
| 2,6-Di-tert-butyl-4-methyl phenol | 0.3 | 0.4 | 0.3 | 0.3 |
| 2,6-Bis(4-azidobenzylidene)-4-methylcyclohexanone | 3.5 | 3.0 | 2.9 | 3.5 |
| Modified polysiloxane | 0.2 | 0.3 | 0.2 | 0.2 |

TABLE 2

|  | Comparative Embodiment 1 |
| --- | --- |
| Polymethacrylate | 45 |
| Polyester acrylate | 10 |
| Isobornyl methacrylate | 20 |
| Phenoxymethylethyl acrylate | 15 |
| Tricyclodecane dimethanol diacrylate | 3 |
| 1-Hydroxycyclohexyl phenyl ketone | 2 |
| Diphenyl(2,4,6-trimethylbenzoyl)phosphine oxide | 2 |
| Modified polysiloxane | 3 |

Experiment 1: Elastic Modulus Test

In experiment 1, the elastic modulus of the optical clear adhesive layers formed from the optical clear adhesive compositions with components and concentrations shown in Embodiment 1, Embodiment 2, Embodiment 3, Embodiment 4, and Comparative Embodiment 1 were tested at 25° C. and 85° C. The results are in Table 3. A higher elastic modulus means a higher resistance of the material to deformation. As can be seen from Table 3, Embodiment 1, Embodiment 2, Embodiment 3, and Embodiment 4 have greater elastic modulus than those of Comparative Embodiment 1 at 25° C. and 85° C. The abilities to resist the deformation in Embodiment 1, Embodiment 2, Embodiment 3, and Embodiment 4 are significantly better than Comparative Embodiment 1. Therefore, compared to Comparative Embodiment 1, the optical clear adhesive layers in Embodiment 1, Embodiment 2, Embodiment 3, and Embodiment 4 avoid edge bubbles more when binding parts in a module. On the contrary, Comparative Embodiment 1 has the elastic modulus of 0.6 MPa at 85° C., which fails to avoid the formation of edge bubbles.

TABLE 3

|  | Embodiment 1 | Embodiment 2 | Embodiment 3 | Embodiment 4 | Comparative Embodiment 1 |
|---|---|---|---|---|---|
| Elastic Modulus at 25° C. (MPa) | 16 | 17 | 15 | 16 | 1.4 |
| Elastic Modulus at 85° C. (MPa) | 1.3 | 1.4 | 1.2 | 1.1 | 0.6 |

Experiment 2: Ratio of Elastic Modulus to Elastic Modulus Test

In experiment 2, the ratios of elastic modulus at −20° C. to elastic modulus at 65° C. and the ratios of elastic modulus at −40° C. to elastic modulus at 85° C. of the optical clear adhesive layers formed from the optical clear adhesive compositions with components and concentrations shown in Embodiment 1, Embodiment 2, Embodiment 3, Embodiment 4, and Comparative Embodiment 1 were tested. The results are in Table 4. A higher ratio means a greater difference between the elastic modulus at high and low temperatures, which also means that the optical clear adhesive layer changes greatly by heat expansion, thus causing edge bubbles easily in the module. As can be seen from Table 4, the ratios of elastic modulus at −20° C. to elastic modulus at 65° C. and the ratios of elastic modulus at −40° C. to elastic modulus at 85° C. in Embodiment 1, Embodiment 2, Embodiment 3, and Embodiment 4 are smaller than those in Comparative Embodiment 1, indicating that the optical clear adhesive layer of the present disclosure is applicable in the environment changing with cold and hot differently and the formation of bubbles are suppressed at the edge of the module. However, the optical clear adhesive layer of Comparative Embodiment 1 deforms significantly in the environment with cold and hot changing differently, i.e., Comparative Embodiment 1 fails to avoid the formation of bubbles at the edge of the module.

TABLE 4

|  | Embodiment 1 | Embodiment 2 | Embodiment 3 | Embodiment 4 | Comparative Embodiment 1 |
|---|---|---|---|---|---|
| Elastic Modulus at −20° C./Elastic Modulus at 65° C. | 112 | 140 | 105 | 120 | 287 |
| Elastic Modulus at −40° C./Elastic Modulus at 85° C. | 257 | 296 | 223 | 270 | 1250 |

Experiment 3: Adhesion Strength, Elastic Modulus, and Ratio of Adhesion Strength to Elastic Modulus Test In experiment 3, adhesion strengths at 85° C., elastic modulus at 85° C., and ratios of adhesion strength at 85° C. to elastic modulus at 85° C. of the optical clear adhesive layers formed from the optical clear adhesive compositions with components and concentrations shown in Embodiment 1, Embodiment 2, Embodiment 3, Embodiment 4, and Comparative Embodiment 1 were tested. The results are in Table 5. The ratio of adhesion strength at 85° C. to elastic modulus at 85° C. greater than 1 means that the optical clear adhesive layer has strong adhesion strength to bind parts in a module. As can be seen from Table 5, the ratios of adhesion strength at 85° C. to elastic modulus at 85° C. in Embodiment 1, Embodiment 2, Embodiment 3, and Embodiment 4 are greater than 1 (i.e., adhesion strength is larger than elastic modulus). Compared with Comparative Embodiment 1 with the ratio of adhesion strength at 85° C. to elastic modulus at 85° C. less than 1 (i.e., adhesion strength is smaller than elastic modulus), the optical clear adhesive layers in Embodiment 1, Embodiment 2, Embodiment 3, and Embodiment 4 bind the parts in a module more tightly under high temperature and avoid bubbles.

TABLE 5

| | Embodiment 1 | Embodiment 2 | Embodiment 3 | Embodiment 4 | Comparative Embodiment 1 |
|---|---|---|---|---|---|
| Adhesion Strength at 85° C. (N/mm$^2$) | 1.5 | 1.6 | 1.4 | 1.4 | 0.2 |
| Elastic Modulus at 85° C. (MPa) | 1.3 | 1.4 | 1.2 | 1.1 | 0.6 |
| Adhesion Strength at 85° C./Elastic Modulus at 85° C. | 1.16 | 1.14 | 1.17 | 1.27 | 0.33 |

Experiment 4: Wedge Test and Cold and Hot Change Test

Figure 4:
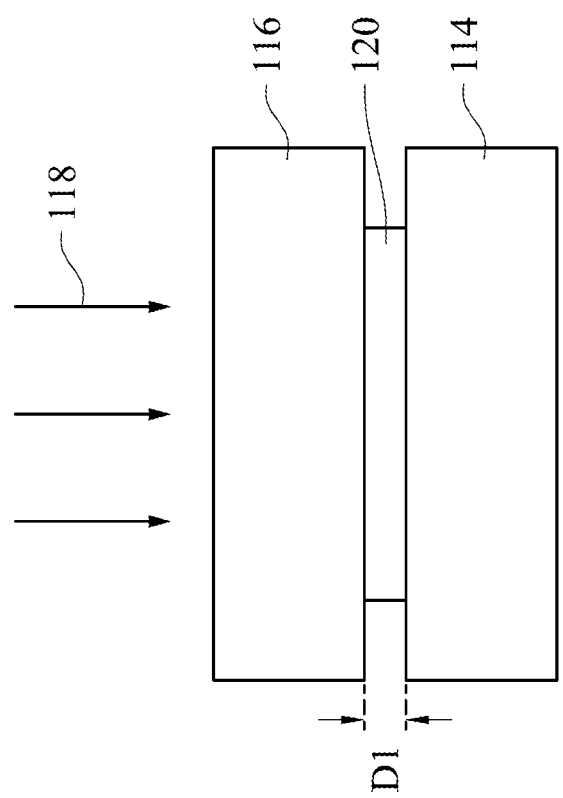
FIGS. 4 to 5 are the intermediate stage diagrams in a wedge test and a cold and hot change test to the optical clear adhesive layer according to some embodiments of the present disclosure.
Figure 5:
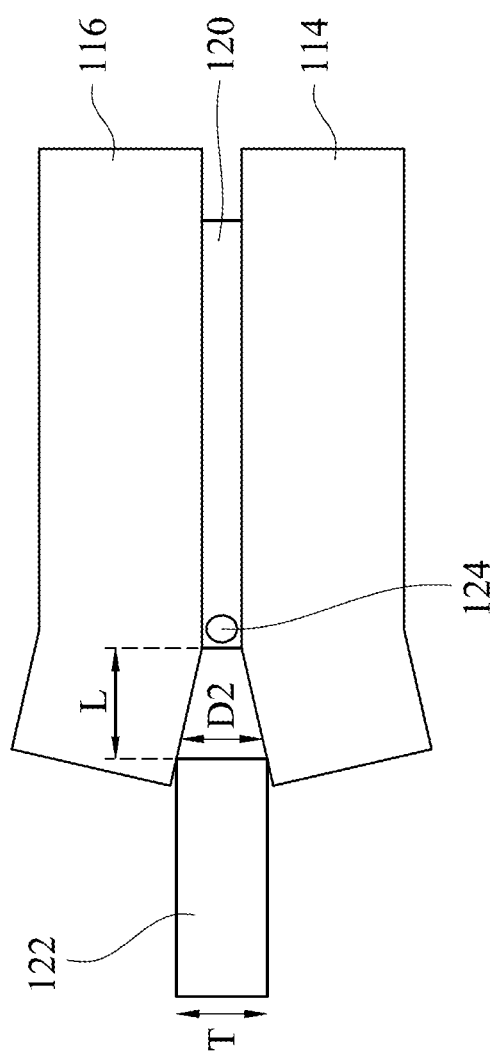

In Experiment 4, the ability of the optical clear adhesive layers formed from the optical clear adhesive compositions with components and concentrations shown in Embodiment 1 and Comparative Embodiment 1 to inhibit the formation of bubbles in an environment of rapid change in cold and hot were tested. The illustrative diagrams of the wedge test and the cold and hot change test show in FIGS. 4 to 5. The optical clear adhesive composition (not shown) was applied between a substrate 114 (e.g., glass) and a substrate 116 (e.g., glass). An ultraviolet light 118 cured the optical clear adhesive composition to form an optical clear adhesive layer 120 between the substrate 114 and the substrate 116, in which the substrate 114 and the substrate 116 were bonded to each other with a spacing D1 being 200 μm. Next, a shim 122 with a thickness T of 400 μm was inserted between the substrate 114 and the substrate 116, in which the distance length L between the shim 122 and the optical clear adhesive layer 120 was 6 mm. Because the thickness T of the shim 122 was greater than the spacing D1 between the substrate 114 and the substrate 116, the substrate 114 and the substrate 116 deformed, for example, to have a spacing D2 greater than 200 μm between the substrate 114 and the substrate 116, which may produce bubble 124 at the edge of the optical clear adhesive layer 120. Later, the temperature of the environment changed between −40° C. to 85° C. in cycles where a cycle was an hour. The size of bubble 124 was observed after cycling for 0 hours, 24 hours, and 48 hours. As can be seen from Table 6, the bubble sizes in Embodiment 1 are smaller than those in Comparative Embodiment 1 at 0 hours, 24 hours, and 48 hours, indicating that the optical clear adhesive layer formed from the optical clear adhesive composition of the present disclosure can effectively inhibit bubble formation, even though it is applied to the module that has deformed. Furthermore, the optical clear adhesive layer of the present disclosure is applicable in the environment where cold and hot change differently to inhibit bubble formation.

TABLE 6

| | 0 hours | 24 hours | 48 hours |
|---|---|---|---|
| Embodiment 1 | 1.9 mm | 4.5 mm | 7.3 mm |
| Comparative Embodiment 1 | 2.6 mm | 12.1 mm | 14.2 mm |

Experiment 5: Cold and Hot Change Test and Ultraviolet Light Exposure Test

In Experiment 5, the optical clear adhesive layers formed from the optical clear adhesive compositions with components and concentrations shown in Embodiment 1 were deformed by a stress of 0.5 Mpa. The changes of the optical phases of light passing through the deformed optical clear adhesive layers were measured in a cold and hot change test (temperature cycling between −40° C. to 85° C. for 500 hours) and an ultraviolet light exposure test (exposed under ultraviolet light for 500 hours). The results show that the optical phase differences were 0 nm, indicating that the light passing the optical clear adhesive layer of the present disclosure does not change the phase. The optical clear adhesive layer of the present disclosure does not cause an uneven display caused by the optical phase change when applied to the display module. The zero optical phase difference also applies to the environments with cold and hot changing differently and the environments with long-term ultraviolet light exposure.

Experiment 6: Physical Properties Test

In Experiment 6, the physical properties of the optical clear adhesive layers formed from the optical clear adhesive compositions with components and concentrations shown in Embodiment 1, Embodiment 2, Embodiment 3, Embodiment 4, and Comparative Embodiment 1 were tested. The tests include haze test, optical phase difference test, thermal expansion coefficient test, wedge test, high temperature and high humidity reliability test, G' value test, Tan δ value test, and elongation at break test. The results are in Table 7.

that of Comparative Embodiment 1, indicating that the optical clear adhesive layer of the present disclosure has good adhesion strength.

In high temperature and high humidity reliability test, whether bubbles in the modules bonded with the optical clear adhesive layers could form under a temperature of 65° C. and a relative humidity of 90% for 504 hours was

TABLE 7

|  | Embodiment 1 | Embodiment 2 | Embodiment 3 | Embodiment 4 | Comparative Embodiment 1 |
|---|---|---|---|---|---|
| Haze (%). | 0.01 | 0.02 | 0.01 | 0.03 | 0.18 |
| Optical Phase Difference (nm) | 0 | 0 | 0 | 0 | 3 |
| Thermal Expansion Coefficient (/° C.) | 140 | 150 | 135 | 148 | 220 |
| Wedge Test (mm) | 7.3 | 8.0 | 10.1 | 8.4 | 14.2 |
| High Temperature and High Humidity Reliability Test | Pass | Pass | Pass | Pass | Fail |
| G'@85° C. (Pa) | 1.3 | 1.4 | 1.2 | 1.1 | 0.6 |
| Tanδ @85° C. | 0.19 | 0.20 | 0.25 | 0.20 | 0.31 |
| Elongation at Break (%) | 410 | 380 | 425 | 415 | 180 |

In haze test, hazes were tested using an ultraviolet-visible spectrometer (haze specification<1). In Table 7, the hazes of Embodiment 1, Embodiment 2, Embodiment 3, and Embodiment 4 are less than the that of Comparative Embodiment 1, indicating that the use of the optical clear adhesive layer of the present disclosure does not cause light to diffuse too much when light passes the optical clear adhesive layer. For example, when the optical clear adhesive layer of the present disclosure is applied to a display module, the display performance will not behave poorly owing to the light diffusion.

In optical phase difference test, the optical clear adhesive layers were deformed by stress with, for example, 0.5 MPa, and after 500 hours under a temperature of 65° C. and a relative humidity of 90%, the optical phase differences of light passing the optical clear adhesive layers were measured. In Table 7, the optical phase differences of Embodiment 1, Embodiment 2, Embodiment 3, and Embodiment 4 are zero, and the optical phase difference of Comparative Embodiment 1 was not zero, which had an optical phase difference, indicating that the use of the optical clear adhesive layer of the present disclosure does not cause an uneven display when applied to a display module and this advantage applies to the situations when temperature and humidity are relatively high after a long-term use.

In thermal expansion coefficient test, the thermal expansion coefficients of Embodiment 1, Embodiment 2, Embodiment 3, and Embodiment 4 are smaller than that of Comparative Embodiment 1 in Table 7, indicating that the optical clear adhesive layer of the present disclosure is less likely to deform by thermal and avoids bubble generation.

The wedge test was similar to the above Experiment 4, so the details are not repeated hereafter, but unlike Experiment 4, the temperature here was 65° C. and lasted for 48 hours. In the wedge test, the distances between the bubble and the edge of the optical clear adhesive layer were measured. A smaller distance means better adhesion durability of the optical clear adhesive layer to avoid the bubble becoming bigger. In Table 7, the distances of Embodiment 1, Embodiment 2, Embodiment 3, and Embodiment 4 are smaller than observed. In Table 7, Embodiment 1, Embodiment 2, Embodiment 3, and Embodiment 4 are indicated as "Pass," indicating that no visible bubble was observed with naked eye, while Comparative Embodiment 1 is indicated as "Fail," indicating that visible bubble was observed with naked eye. The optical clear adhesive layer of the present disclosure inhibits the generation of bubbles under the condition of high temperature and high humidity.

In G' value test and Tan δ value test, G' value and Tan δ value represent the degree of crosslinking and the loss factor of the curing in the formation of the optical clear adhesive layer, respectively. In Table 7, the G' values of Embodiment 1, Embodiment 2, Embodiment 3, and Embodiment 4 are greater than the G' value of Comparative Embodiment 1, indicating that the crosslinking and curing of the optical clear adhesive layer of the present disclosure is high. In Table 7, the Tan δ values of Embodiment 1, Embodiment 2, Embodiment 3, and Embodiment 4 are less than the Tan δ value of Comparative Embodiment 1, indicating that the loss in the curing and crosslinking of the formation of the optical clear adhesive layer in the present disclosure is low.

In elongation at break test, the optical clear adhesive layers were stretched at a speed of 60 mm/min at 25° C. and the elongation ratios at break were measured. In Table 7, the elongation ratios at break in Embodiment 1, Embodiment 2, Embodiment 3, and Embodiment 4 are greater than that in Comparative Embodiment 1, indicating that the optical clear adhesive layer of the present disclosure has better elasticity.

The optical clear adhesive layer prepared by the optical clear adhesive composition of the present disclosure has good optical properties, for example, high transmittance, high refraction, low haze, and zero optical phase difference when light passes the optical clear adhesive layer. Even in a high-temperature and high-humidity environment or in a situation where the module has been deformed, the optical phase difference is still zero. Moreover, the optical clear adhesive layer of the present disclosure has good adhesion strength and good elastic modulus, in which the ratio of adhesion strength to elastic modulus is greater than 1 (i.e., adhesion strength is greater than elastic modulus). Even at high temperatures of 80° C. to 90° C., the ratio of adhesion strength to elastic modulus is greater than 1. The ratio of adhesion strength to elastic modulus greater than 1 means that optical clear adhesive layer of the present disclosure binds the parts in the module well. In addition, the optical clear adhesive layer of the present disclosure suppresses the bubble to form even in the environments with high temperature and high humidity and the environments with dramatic changes between cold and hot.

Although the present disclosure has been described in considerable detail in some embodiments, other embodiments are possible. Therefore, the description of the embodiments herein should not limit the spirit and scope of the claims attached below.

For one skilled in the art, various modifications and changes may be made to the present disclosure without deviating from the spirit and scope of the present disclosure. In this situation, the present disclosure intends to cover the modifications and changes to the present disclosure as long as such modifications and changes fall within the spirit and scope of the claims attached.

What is claimed is:

1. An optical clear adhesive composition, comprising:
    a first polydiene having a first weight average molecular weight of 500 Da to 1500 Da;
    a second polydiene having a second average molecular weight of 50000 Da to 110000 Da;
    a plurality of acrylate monomers comprising at least two different hydroxyacrylates; and
    a photoinitiator.

2. The optical clear adhesive composition of claim 1, wherein a mass ratio of the first polydiene to the second polydiene is 1:7 to 1:9.

3. The optical clear adhesive composition of claim 1, wherein the first polydiene and the second polydiene account for 30 wt % to 60 wt % in the optical clear adhesive composition, the acrylate monomers account for 35 wt % to 65 wt % in the optical clear adhesive composition, and the photoinitiator accounts for 0.1 wt % to 5 wt % in the optical clear adhesive composition.

4. The optical clear adhesive composition of claim 1, wherein the first polydiene comprises polyisoprene, polybutadiene, or a combination thereof, and the second polydiene comprises polyisoprene, polybutadiene, or a combination thereof.

5. The optical clear adhesive composition of claim 1, wherein the at least two different hydroxyacrylates comprise hydroxypropyl methacrylate and hydroxyethyl methacrylate.

6. The optical clear adhesive composition of claim 1, wherein the at least two different hydroxyacrylates account for 4.2 wt % to 25 wt % in the optical clear adhesive composition.

7. The optical clear adhesive composition of claim 1, wherein the acrylate monomers comprise 3-phenoxybenzyl acrylate, tricyclo[5.2.1.02,6]decan-8-ol methacrylate, hydroxypropyl methacrylate, hydroxyethyl methacrylate, and lauryl acrylate.

8. The optical clear adhesive composition of claim 7, wherein the 3-phenoxybenzyl acrylate accounts for 5 wt % to 40 wt % in the optical clear adhesive composition, the tricyclo[5.2.1.02,6]decan-8-ol methacrylate accounts for 10 wt % to 40 wt % in the optical clear adhesive composition, the hydroxypropyl methacrylate accounts for 4 wt % to 15 wt % in the optical clear adhesive composition, the hydroxyethyl methacrylate accounts for 0.2 wt % to 10 wt % in the optical clear adhesive composition, and the lauryl acrylate accounts for 0 wt % to 15 wt % in the optical clear adhesive composition.

9. The optical clear adhesive composition of claim 1, wherein the photoinitiator is a phosphine oxide photoinitiator.

10. The optical clear adhesive composition of claim 9, wherein the phosphine oxide photoinitiator comprises diphenyl(2,4,6-trimethylbenzoyl)phosphine oxide.

11. The optical clear adhesive composition of claim 1, further comprising an antioxidant, a crosslinking agent, and a leveling agent.

12. The optical clear adhesive composition of claim 11, wherein the antioxidant comprises 2,6-di-tert-butyl-4-methylphenol, the crosslinking agent comprises 2,6-bis(4-azidobenzylidene)-4-methylcyclohexanone, and the leveling agent comprises modified polysiloxane.

13. The optical clear adhesive composition of claim 12, wherein the 2,6-di-tert-butyl-4-methylphenol accounts for 0.1 wt % to 5 wt % in the optical clear adhesive composition, the 2,6-bis(4-azidobenzylidene)-4-methylcyclohexanone accounts for 0.1 wt % to in the optical clear adhesive composition, and the modified polysiloxane accounts for 0.1 wt % to 5 wt % in the optical clear adhesive composition.

14. An optical clear adhesive layer prepared by curing and crosslinking the optical clear adhesive composition of claim 1 with an ultraviolet light irradiation.

15. The optical clear adhesive layer of claim 14, wherein a ratio of an adhesion strength to an elastic modulus of the optical clear adhesive layer at a temperature of 80° C. to 90° C. is greater than 1.

16. The optical clear adhesive layer of claim 14, wherein a tensile strength of the optical clear adhesive layer is between 3.7 N/mm$^2$ to 3.8 N/mm$^2$.

17. The optical clear adhesive layer of claim 14, wherein an optical phase difference of the optical clear adhesive layer is zero.

18. The optical clear adhesive layer of claim 14, wherein a haze of the optical clear adhesive layer is between 0.01% to 0.03%.

19. A method of forming optical clear adhesive layer, comprising:
    irradiating the optical clear adhesive composition of claim 1 with an ultraviolet light to cure and crosslink the optical clear adhesive composition.

20. The method of claim 19, wherein an intensity of the ultraviolet light is between 40 mW/cm$^2$ to 200 mW/cm$^2$.

* * * * *